United States Patent
Wu

(10) Patent No.: US 7,201,688 B2
(45) Date of Patent: Apr. 10, 2007

(54) POWER TRANSMISSION BELT

(75) Inventor: Shawn Xiang Wu, Troy, MI (US)

(73) Assignee: The Gates Corporation, Denver, CO (US)

( * ) Notice: Subject to any disclaimer, the term of this patent is extended or adjusted under 35 U.S.C. 154(b) by 235 days.

(21) Appl. No.: 10/796,710

(22) Filed: Mar. 9, 2004

(65) Prior Publication Data
US 2005/0202916 A1 Sep. 15, 2005

(51) Int. Cl.
F16G 1/10 (2006.01)
(52) U.S. Cl. ..................................... 474/237
(58) Field of Classification Search ................ 474/202, 474/237, 230, 242, 252, 265
See application file for complete search history.

(56) References Cited

U.S. PATENT DOCUMENTS

| 5,073,440 A | 12/1991 | Lee ............................. 428/224 |
| 5,135,687 A | 8/1992 | Lee .............................. 264/28 |
| 5,310,386 A | 5/1994 | Mizuno et al. |
| 5,416,164 A | 5/1995 | Lee ............................. 525/182 |
| 5,532,059 A * | 7/1996 | Lee ............................. 428/359 |
| 5,610,217 A | 3/1997 | Yarnell et al. .............. 524/397 |
| 5,807,194 A | 9/1998 | Knutson et al. ............ 474/268 |
| 6,358,171 B1 * | 3/2002 | Whitfield ..................... 474/266 |
| 6,511,394 B2 * | 1/2003 | Okuno et al. ............... 474/260 |
| 6,616,558 B2 | 9/2003 | South ......................... 474/260 |
| 2002/0042317 A1 | 4/2002 | South |

FOREIGN PATENT DOCUMENTS

WO   WO 96/02584   2/1996

* cited by examiner

Primary Examiner—Vicky A. Johnson
(74) Attorney, Agent, or Firm—P. N. Dunlap, Esq.; C. H. Castleman, Esq.; J. A. Thurnau, Esq.

(57) ABSTRACT

An endless power transmission belt comprising load carrier cord comprising a cord formed from a plurality of strands, wherein the strands comprise fibers of para-aramid and polyvinylpyrrolidone (PVP); and a method for increasing the flexural fatigue resistance and durability of an endless belt, comprising the step of selecting for the belt's load carrier cord a yarn comprising a fiber of para-aramid and PVP.

20 Claims, 3 Drawing Sheets

POWER TRANSMISSION BELT

BACKGROUND OF THE INVENTION

1. Field of the Invention

The present invention pertains to endless belts comprising a load carrier cord, and particularly to such belts wherein the cord comprises a plurality of fibers of para-aramid and a second polymer.

2. Description of Related Art

In the construction of endless belts and other rubber composite articles employing a load-carrying cord comprising a plurality of yarns, it is known to utilize high strength fibers to form the cords. In such constructions intended for use in automotive and some industrial applications for example it is known to utilize such materials as para-aramid, polyethylene naphthalate (PEN) and poly-p-phenylene benzobisoxazole (PBO) as the fiber from which the load carrier cords are formed.

Particularly but not exclusively in the area of multi-V-ribbed belts, synchronous or toothed belts and V-belts for utilization in automotive applications, including modern multi-function automotive applications such as electromechanical drives, the performance requirements for both the belt's flexural fatigue resistance and its load carrying capability have increased dramatically. Higher modulus cords, including those formed of PEN, PBO and para-aramid, have been identified for such purposes due to their high load carrier capability but are known to exhibit relatively poor flexural fatigue resistance. Attempts have been made to improve the flexural fatigue resistance of belts formed from such cords, e.g., by manipulating the configuration of the cords by utilizing for example braided cord instead of plied cord or increased twist level of the cord; but such methods generally increase production costs, and tend to decrease the overall cord strength and modulus, thereby diminishing the materials' usefulness.

The need remains for a load carrier cord, including for incorporation in an endless belt or similar rubber composite article, which exhibits a good balance of load carrying capability and flexural fatigue resistance.

SUMMARY OF THE INVENTION

The present invention provides an endless belt comprising load carrier cord comprising a plurality of fibers, wherein the fibers comprise para-aramid and polyvinylpyrrolidone (PVP).

In a further embodiment the present invention provides an endless belt, such as a multi-V-ribbed belt, a V-belt, or a toothed belt, comprising such cord within its load carrier section.

In yet further embodiments the para-aramid of the fibers is poly(p-phenylene terephthalamide) (PPD-T), and the fibers comprise from 3 to 30% by weight of PVP based on the weight of para-aramid.

A method of increasing the flexural fatigue resistance and durability of an endless belt is moreover provided, comprising the step of selecting for the belt's load carrier cord a yarn comprising a fiber of para-aramid and PVP.

BRIEF DESCRIPTION OF THE DRAWINGS

The accompanying drawings, which are incorporated in and form a part of the specification, illustrate preferred embodiments of the invention, and together with the description, serve to explain the principles of the invention. In the drawings, like numerals denote like parts and.

DETAILED DESCRIPTION

Figure 1:
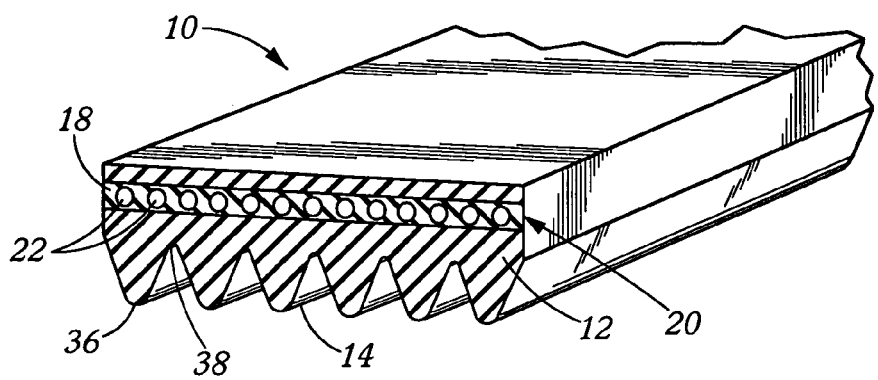
FIG. 1 is a perspective view, with parts in section, of a portion of a multi-V-ribbed belt constructed in accordance with an embodiment of the present invention.

Referring to FIG. 1, a multi-V-ribbed belt 10 in accordance with an embodiment of the present invention is shown generally. The multi-V-ribbed belt 10 includes an elastomeric main belt body portion 12, or undercord, and a sheave contact portion 14 positioned along the inner periphery of the main belt body portion 12. The word, "sheave" as used in this context includes conventional pulleys and sprockets used with a power transmission belt, and also rollers and like mechanisms. The particular sheave contact portion 14 of the belt of FIG. 1 is in the form of a plurality of ribs comprising raised areas or apexes 36 alternating with a plurality of trough areas 38 defining therebetween oppositely facing sides. In each of the instances of FIGS. 1–2, the sheave contact portion 14 is integral with the main belt body portion 12 and may formed from the same elastomeric material(s) as described below. In FIG. 3 however, the sheave contact portion 14 can be seen to comprise a reinforcing fabric 24, explained in further detail below, as conventionally utilized in synchronous belt building configurations, and is thus formed of a material other than that of the main belt body portion 12 in that embodiment of the present invention.

A tensile- or load-carrying section 20 is positioned above the undercord 12 for providing support and strength to the belt 10. In the illustrated form the tensile section comprises at least one longitudinally extending tensile cord 22, described in further detail below, aligned along the length of the belt, and in accordance with various embodiments of the present invention, is at least partially in contact with or is embedded in an adhesive rubber member 18 described in further detail below. The skilled practitioner would readily appreciate that in the several FIGS. 1–2, the adhesive rubber member 18 is illustrated in exaggerated form in order to visually distinguish it from the other elastomeric portions of the belt. In actuality, the cured composite is frequently visually indistinguishable from the surrounding elastomeric belt body portion except in cases, e.g., where one and not the other of the adhesive rubber member 18 and the undercord 12 is fiber loaded. The adhesive rubber member 18 may actually be of the same material as the elastomeric main belt body 12.

A reinforcing fabric (not shown in FIG. 1) may optionally be utilized and in the case of V-belts and multi-V-ribbed belts intimately fits along the surface of the belt opposite the sheave contact portion 14 to form a face cover or overcord for the belt. The fabric may be of any desired configuration such as a conventional weave consisting of warp and weft threads at any desired angle, or may consist of warp threads held together by spaced pick cords as exemplified by tire cord fabric, or of a knitted or braided configuration, or of a nonwoven configuration, and the like. The fabric may be friction-or skim-coated with the same or different elastomer composition as that of the elastomeric main belt body 12. More than one ply of fabric may be employed. If desired, the fabric may be cut or otherwise formed to be arranged on a bias so that the strands form an angle with the direction of travel of the belt. One embodiment of such reinforcing fabric use is shown in FIG. 2 wherein a rubber-skim coated tire cord fabric 29, is illustrated in exaggerated form.

Figure 2:
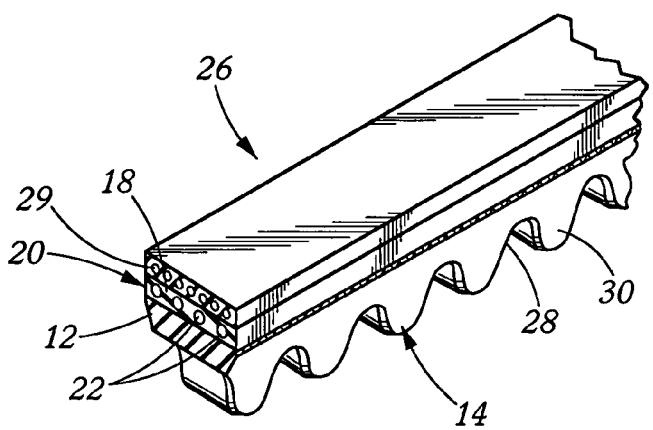
FIG. 2 is a perspective view, with parts in section, of a portion of a V-belt constructed in accordance with another embodiment of the present invention.
Figure 3:
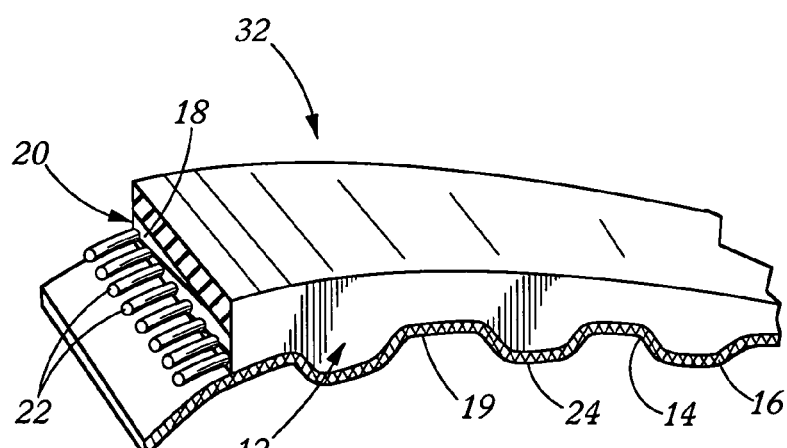
FIG. 3 is a perspective view, with parts in section, of a portion of a synchronous belt constructed in accordance with another embodiment of the present invention.

Referring to FIG. 2, a standard notched V-belt 26 is illustrated. The V-belt 26 includes a main elastomeric belt body portion 12 similar to that illustrated in FIG. 1, and a tensile or load-carrying section 20 in the form of one or more tensile cords 22 embedded in an optional adhesive rubber member 18, also similar to that illustrated in FIG. 1. The main elastomeric belt body portion 12, adhesive rubber member 18 and load-carrying section 20 of the V-belt 26 may be constructed from the same materials as described above for FIG. 1.

The V-belt 26 also includes a sheave contact portion 14 as in the multi-V-ribbed belt 10 of FIG. 1. The side surfaces of the elastomeric main belt body portion 12, or in the case of a V-belt as illustrated, of the compression section, serve as the driving surfaces of the belt 26. In the embodiment illustrated, the sheave contact portion 14 is in the form of alternating notch depression surfaces or troughs 28 and toothed projections 30. These alternating depression surfaces 28 and projections 30 may preferably follow a generally sinusoidal path as illustrated which serves to distribute and minimize bending stresses as the sheave contact portion 14 passes around pulleys during operation.

While in the illustrated embodiment, the V-belt 26 is in the form of a raw-edged belt, a reinforcing fabric 29 as described above may moreover be employed, either as a face cover or overcord for the belt as shown, or fully encompassing the belt to form a banded V-belt.

Referring to FIG. 3, a toothed belt 32 is illustrated. The toothed belt 32 includes a main elastomeric belt body portion 12 and sheave contact portion 14 as in the case of the belts of FIGS. 1 and 2, and also includes a load-carrying section 20 as previously described for the belts of FIG. 1 and 2. For the synchronous belt 32 however, the sheave contact portion 14 is in the form of alternating teeth 16 and land portions 19. A reinforcing fabric 24 as furthermore described above for the belts of FIGS. 1 and 2 may also be utilized and in this case intimately fits along the alternating teeth 16 and land portions 19 of the belt 32 to form a face cover therefor.

In each of the cases of FIGS. 1–3 shown above, the main belt body portion 12 may be formed of any conventional and/or suitable cured elastomer composition, and may be of the same as or different from that described below in relation to the optional adhesive rubber member 18. Suitable elastomers that may be utilized for this purpose include for example polyurethane elastomers (including as well polyurethane/urea elastomers) (PU), polychloroprene rubber (CR), acrylonitrile butadiene rubber (NBR), hydrogenated NBR (HNBR), styrene-butadiene rubber (SBR), alkylated chlorosulfonated polyethylene (ACSM), epichlorohydrin, polybutadiene rubber (BR), natural rubber (NR), and ethylene alpha olefin elastomers such as ethylene propylene copolymers (EPM), ethylene propylene diene terpolymers (EPDM), ethylene octene copolymers (EOM), ethylene butene copolymers (EBM), ethylene octene terpolymers (EODM); and ethylene butene terpolymers (EBDM); and silicone rubber, or a combination of any two or more of the foregoing.

To form the elastomeric belt body portion 12 in accordance with an embodiment of the present invention, the elastomer(s) may be blended with conventional rubber compounding ingredients including fillers, plasticizers, vulcanization agents/curatives and accelerators, in amounts conventionally employed. For example, for use with ethylene-alpha-olefin elastomer and diene elastomers such as HNBR, one or more metal salts of alpha-beta organic acids may be employed in amounts now conventionally utilized to improve dynamic performance of the resultant article. Thus zinc dimethacrylate and/or zinc diacrylate may be utilized in such compositions in amounts of from about 1 to about 50 phr; or alternatively of from about 5 to about 30 phr; or of from about 10 to about 25 phr. These materials furthermore contribute to the adhesiveness of the composition, and increase the overall cross-link density of the polymer upon curing with peroxide or related agents through ionic crosslinking, as is now well known in the art.

One skilled in the relevant art would readily appreciate any number of suitable compositions for utilization in or as the elastomeric portions of the belt. A number of suitable elastomer compositions are described for example in The R. T. Vanderbilt Rubber Handbook (13$^{th}$ ed., 1996), and with respect to EPM or EPDM compositions and such compositions having particular high tensile modulus properties, are furthermore set forth in U.S. Pat. Nos. 5,610,217, and 6,616,558 respectively, the contents of which, with respect to various elastomer compositions that may be suitable for use in the formation of power transmission belt body portions, are specifically incorporated herein by reference. In addition, with respect to several PU compositions that may also be utilized in the practice of various embodiments of the present invention, such compositions are described for example in WO 09692584 to Wu et al., and the contents of that international patent application with respect to same are hereby incorporated herein by reference.

In an embodiment of the present invention associated with automotive accessory drive applications the elastomeric belt body portions 12 may be formed of a suitable ethylene alpha olefin composition, such as an EPM, EPDM, EBM or EOM composition, which may be the same or different composition as that employed as the adhesive rubber member composition.

The elastomeric main belt body portion 12 may moreover be loaded with discontinuous fibers as is well known in the art, utilizing materials such as including but not limited to cotton, polyester, fiberglass, aramid and nylon, in such forms as staple-or chopped fibers, flock or pulp, in amounts generally employed.

In a preferred embodiment relating to profiled (e.g., as by cutting or grinding) multi-v-ribbed belts, such fiber loading is preferably formed and arranged such that a substantial portion of the fibers are formed and arranged to lay in a direction generally transverse the direction of travel of the belt. In molded multi-v-ribbed belts and/or synchronous belts made according to flow through methods however, the fiber loading would generally lack the same degree of orientation.

In accordance with one embodiment of the present invention, the cured composition for utilization in at least partial contact with the load carrier cord within the composite belt structure as described in several embodiments above for FIGS. 1–3 may exhibit at least one of a complex modulus of at least 15,000 kPa, or in the range of from about 25,000 to about 100,000 kPa, or in the range of from about 35,000 to about 75,000 kPa, or in the range of from about 40,000 to about 60,000 kPa, as measured at a temperature of 175° C., at a strain of 0.09 degrees, and a frequency of 2000 cycles per minute ("cpm"); and a tensile modulus as measured at 125° C. and at a cross-head speed of 6 in./min (15.24 cm/min) and in accordance with ASTM D412, of at least about 250 psi (1.724 MPa); or within the range of from about 300 psi (2.068 MPa) to about 5000 psi (34.47 MPa); or within the range of from about 350 (2.413 MPa) to about 3000 psi (20.68 MPa). In the present context, the term "complex modulus" is used to describe the complex modulus, conventionally described by the term, "G*", of a composition as determined via dynamic mechanical rheological analysis, which may be performed utilizing appropriate apparatus exemplified by the Rubber Process Analyzer, Model No. 2000 by Monsanto Corporation of St. Louis, Mo. This optional feature and benefits thereof are described in further detail in aforementioned U.S. Pat. No. 6,616,558, the contents of which have been incorporated herein by reference.

Figure 4:
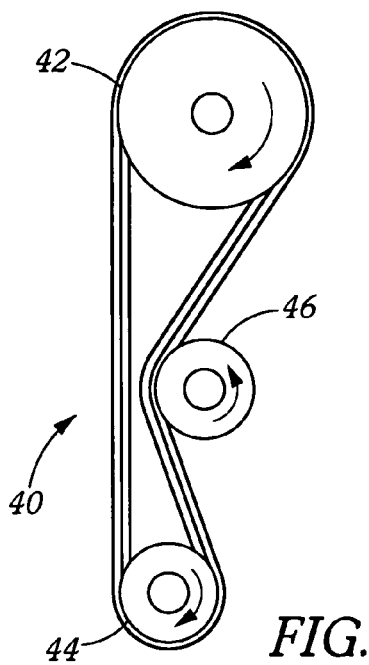
FIG. 4 is a schematic perspective view of the belt of FIG. 1 trained about two pulleys in a drive assembly according to yet another embodiment of the present invention.

In operation, the belt, as shown for example in FIGS. 1–3, is generally trained about at least one driver pulley 42 and one driven pulley 44 as shown for example schematically in FIG. 4, to form a belt drive 40, optionally in combination with an idler pulley 46 as shown.

Turning now to a description of the load carrier cord in accordance with an embodiment of the present invention, in general, the cord 22 of the load-carrying section 20 may be of any suitable and/or conventional configuration such as plied or braided, and generally may comprise one or a plurality of strands which may themselves be of any suitable and/or conventional configuration such as plied or braided, and generally may comprise one or a plurality of yarns. "Yarn" refers to a bundle of filaments or fibers in the form as received from a yarn manufacturer, which may include twisted yarn or yarn with no twist. "Strand" refers to a yarn or yarns that have been twisted, plied or braided as an intermediate step in forming a cord. In an embodiment of the present invention at least one strand forming the cord 22 of the load-carrying section 20 comprises a fiber of para-aramid and PVP. By PVP is meant the polymer that results from linear polymerization of monomer units of N-vinyl-2-pyrrolidone and includes small amounts of comonomers that may be present in concentrations below those that interfere with the interaction of the PVP with the para-aramid.

Any useful combination by weight of PVP and para-aramid in the fiber of the belt's load carrier section cord's yarn may be utilized in the practice of various embodiments of the present invention. In at least one embodiment of the present invention however the fiber includes up to about 30 percent by weight of the PVP based on the weight of the para-aramid. In further embodiments, PVP may be present in an amount within the range of from about 3% to about 30% by weight; or of from about 5% to about 25%; or of from about 7% to about 20% by weight. Above about 30% PVP, the physical properties of the fiber are degraded. Below about 3% PVP, the beneficial effect of the PVP may be hard to detect.

By para-aramid is meant a long chain synthetic polyamide having its amide linkages attached directly to two aromatic rings. As the para-aramid in the present invention, use may be made of PPD-T, poly(p-benzamide), copoly(p-phenylene/3,4'-oxydiphenylene terephthalamide), or the like.

In accordance with an embodiment of the present invention the para-aramid is PPD-T. By PPD-T is meant the homopolymer resulting from mole-for-mole polymerization of p-phenylene diamine and terephthaloyl chloride and, also, copolymers resulting from incorporation of small amounts of other diamines with the p-phenylene diamine and of small amounts of other diacid chlorides with the terephthaloyl chloride. As a general rule, other diamines and other diacid chlorides can be used in amounts up to as much as 10 mole percent of the p-phenylene diamine or the terephthaloyl chloride, or perhaps slightly higher, provided only that the other diamines and diacid chlorides have no reactive groups which interfere with the polymerization reaction. PPD-T also means copolymers resulting from incorporation of other aromatic diamines and other aromatic diacid chlorides as, for example, 2,6-naphthaloyl chloride or chloro-or dichloro-terephthaloyl chloride; provided only that the other aromatic diamines and aromatic diacid chlorides be present in amounts which permit preparation of anisotropic spin dopes.

Suitable fibers and a process for making such fibers, including that of spinning a dope of a combination of PPD-T and PVP, are disclosed for example in U.S. Pat. No. 5,135,687 to Lee, and the relevant contents thereof with respect to which are hereby incorporated herein by reference.

The fiber of the load-carrying section cord in accordance with an embodiment of the present invention may exhibit a filament tenacity of greater than 15 grams per denier and a specific tenacity of greater than 17 grams per denier. The fibers may have any suitable and/or conventional cross-sectional shape, but particularly when formed in accordance with wet spinning or more particularly, air gap spinning processes as described in U.S. Pat. No. 5,135,687 (which is incorporated herein by reference), the fibers useful in the practice of an embodiment of the present invention are generally out-of-round in cross sectional shape.

In accordance with an embodiment of the present invention the density of the fibers comprising PPD-T and PVP may vary with the concentration of PVP in the fiber as disclosed in aforementioned U.S. Pat. No. 5,135,687, and in an embodiment of the present invention, the density of the fibers is within the range of from about 1.45 grams per cubic centimeter (g/cc) at lower PVP concentrations to about 1.36 g/cc at PVP concentrations in the range of from about 7 to 12 percent, but the density of the fibers may be higher or lower as described in aforementioned U.S. Pat. No. 5,135,687 (which is incorporated herein by reference).

In accordance with an embodiment of the present invention, the load carrier cord is formed of one or more fibers of PPD-T and PVP which are arranged and formed by suitable and/or conventional techniques into a yarn which may be suitably arranged and formed into a cord as further described below, which is then helically wrapped and generally arranged to be in contact with at least a portion of or embedded in the elastomeric portion of the belt, e.g., the adhesive rubber member 18 or the main belt body 12 if adhesive member is omitted or of the same material as the main belt body; and extending longitudinally, i.e., in the direction of travel of an endless belt or similar rubber composite article.

The load carrier cords and/or yarns comprising the fibers of PPD-T and PVP in accordance with an embodiment may be treated with one or more adhesive compositions utilizing any suitable and/or conventional materials and application processes, in order to establish or improve their adhesion to the surrounding elastomer constituents of the article as is well known in the art. For example the cord may be treated with an adhesive, or adhesives, to bond the filaments to each other and to promote the adhesion of the cord to the elastomeric portion of the belt In accordance with one embodiment, the cord could be first treated with a primer, which could be either aqueous-based or solvent-based, such as polyisocyanates and epoxy compounds. The treated cord could be then treated with another conventional and/or otherwise suitable adhesive such as resorcinol formaldehyde latex (RFL). After each treatment, the cord is generally passed through an oven or a series of ovens at temperatures from 100° C. to 260° C. to dry and cure the adhesives. Optionally the cord could be then treated with an additional overcoat, e.g., those available under the trademark CHEM-LOK by Lord Corporation, or other suitable rubber cements, for additional adhesion improvement.

Alternatively, e.g., when the surrounding elastomer constituents are of a PU elastomer, such treatment may be limited to application of a primer, or may be further modified or eliminated altogether. Any suitable cord treatment process may be utilized however, and as an example U.S. Pat. No. 5,807,194 discloses a method for treating cords for utilization in PU-based endless belts, and the relevant contents thereof are hereby incorporated herein by reference.

The number, denier, twist and other configurational parameters of the cord comprising the fibers of PPD-T and PVP in accordance with an embodiment of the present invention are not limited, and it is envisioned that any suitable and/or conventional such parameters may be employed as called for in the intended application. As noted above, individual fibers or yarns may be plied (i.e., twisted) or braided to form strands, and such strands may moreover be plied or braided to form cords in accordance with various embodiments of the present invention.

Any suitable and/or conventional method may be utilized to form the belts in accordance with various embodiments of the present invention. For example, where non-castable belt elastomers are utilized, i.e., millable rubbers, either with or without fiber loading, the belt building steps may include those of positioning an optional fabric cover element as described above within an appropriately configured mold cavity having grooved portions for the formation of teeth or ribs or notches, or upon a suitably configured belt-building drum or mandrel; disposing the load carrier cord against the second surface of the fabric cover element, such as by helically winding one or more tensile cords about the fabric; disposing elastomeric material against the tensile member; disposing additional alternating arrangements of tensile members and/or elastomeric material against this tensile member as required of a given construction; applying sufficient temperature and pressure to cure or vulcanize the elastomer materials; and removing the assembly from the mold cavity or mandrel.

Where castable belt body portions are utilized, e.g., in toothed PU belt manufacture, the production steps may furthermore include optionally wrapping a wear-resistant fabric about the surface of a grooved mold portion in a manner such that the first surface of the fabric cover element is adjacent the grooved mold portion; applying the load carrier cord about the wear-resistant fabric such as by helically winding one or more tensile cords about the fabric; introducing a substantially liquid elastomeric material into the mold cavity; and polymerizing the thus formed product. The tooth portions of such belts may moreover have any suitable shape, including curvilinear, trapezoidal, etc.

It has been found that prior art attempts to improve the durability of endless belts by selecting as the load carrying cord fibers of increasingly higher modulus materials such as PEN, PBO and aramid have generally resulted in decreasing flexural fatigue resistance. The present invention overcomes these problems by utilizing as the fiber from which the load carrier cord(s) is formed, a combination of a para-aramid and PVP; and in one embodiment of the present invention, the para-aramid is PPD-T. This combination, while forming a relatively softer, i.e., lower modulus, cord than those conventionally believed to be suitable for such purpose, has now been unexpectedly found to result in a significant increase in both load carrying capability and flexural fatigue resistance compared to substantially identical belts employing as their load carrier cord the same para-aramid fibers but lacking the PVP component.

To illustrate various benefits of embodiments of the present invention, a number of endless multi-V-ribbed belts were constructed which were substantially identical to one another with the exception of the particular type of load carrier cord. The mold used in each case had an outside diameter of 1225 mm. In each case, the belts included three ribs, the undercord was in each instance a conventional EPDM-based composition as generally described in aforementioned U.S. Pat. No. 5,610, 217; the adhesion gum in which the load carrier cord was embedded was similarly a conventional EPDM-based composition. Each belt moreover included a fabric backing. For the belts constructed in accordance with an embodiment of the present invention and also the comparative belts of the prior art, the load carrier cord was in each instance 4000 denier, identified as 1000 ¼, wherein the 1000 denier yarns were first twisted individually in the Z direction at a rate of nine turns per inch, and four of the thus-twisted strands were then twisted in the opposite direction at a rate of five turns per inch. For the belts constructed in accordance with an embodiment of the present invention, the fibers were PPD-T with 13% by weight PVP, while for the belts of the prior art the fibers were the same PPD-T but with no PVP. In each case the fibers for the cords were supplied by E.I. DuPont de Nemours and Company, and with regard to the PPD-T/PVP fibers, are believed to have been formed in accordance with the air gap spinning method as described in aforementioned U.S. Pat. No. 5,135,687 (incorporated herein by reference).

In each instance the yarns and cords formed therefrom employed a conventional three-dip adhesive system as described above, comprising a first application to the yarns of an isocyanate-based primer; followed by the application to the yarns of a conventional RFL compatible with the surrounding belt materials, and thereafter application to the twisted cord of an adhesive composition available from Lord Corporation under the trademark CHEMLOK. The adhesion between the cords and the conventional EPDM-based adhesion gum was evaluated using a peel adhesion test based on ASTM D-413. No significant difference was observed between the adhesion levels of the PPD-T/PVP cord and the PPD-T cord with no PVP.

For each belt, tensile properties as shown in Table 1 below were determined in accordance with ASTM D885; Durability was determined utilizing the test configuration represented in FIG. 5 and further described below; and belt Flexural Fatigue Resistance was determined utilizing the test configuration represented in FIG. 6 and further described below.

Figure 5:
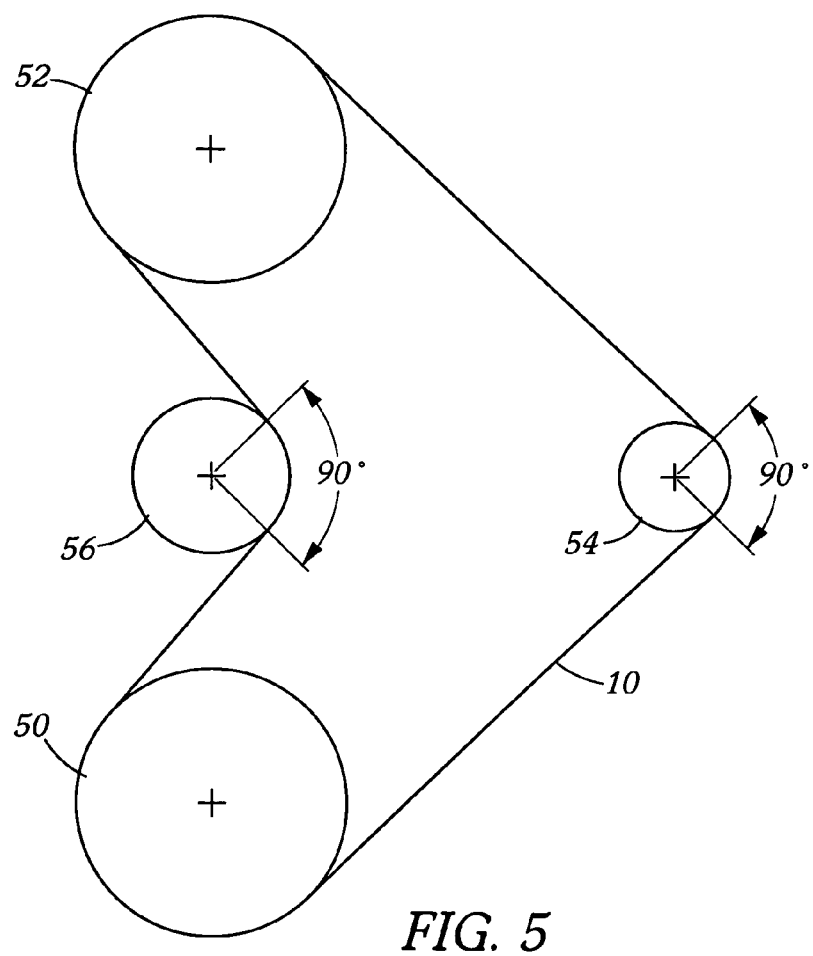
FIG. 5 is a schematic representation of a durability test configuration utilized in describing an embodiment of the present invention; and, FIG. 6 is a schematic representation of a flexural fatigue resistance test configuration utilized in describing an embodiment of the present invention.

For the Durability analysis, the belts were trained around two multi-grooved major pulleys 50, 52, a multi-grooved inside tensioning idler 54 and a backside idler 56 as shown schematically in FIG. 5. The two major pulleys measured 120.65 mm in diameter, the backside idler measured 76.2 mm in diameter and the tensioning idler measured 44.45 mm in diameter. The belts were operated with pulley 50 driven at 4900 rpm at 100° C., 12.7 kW of power, with 24.7 Nm of torque at a constant horizontal tension of 77.1 kg to a point of failure, as evidenced by tensile cord break or rubber chunk out.

Figure 6:
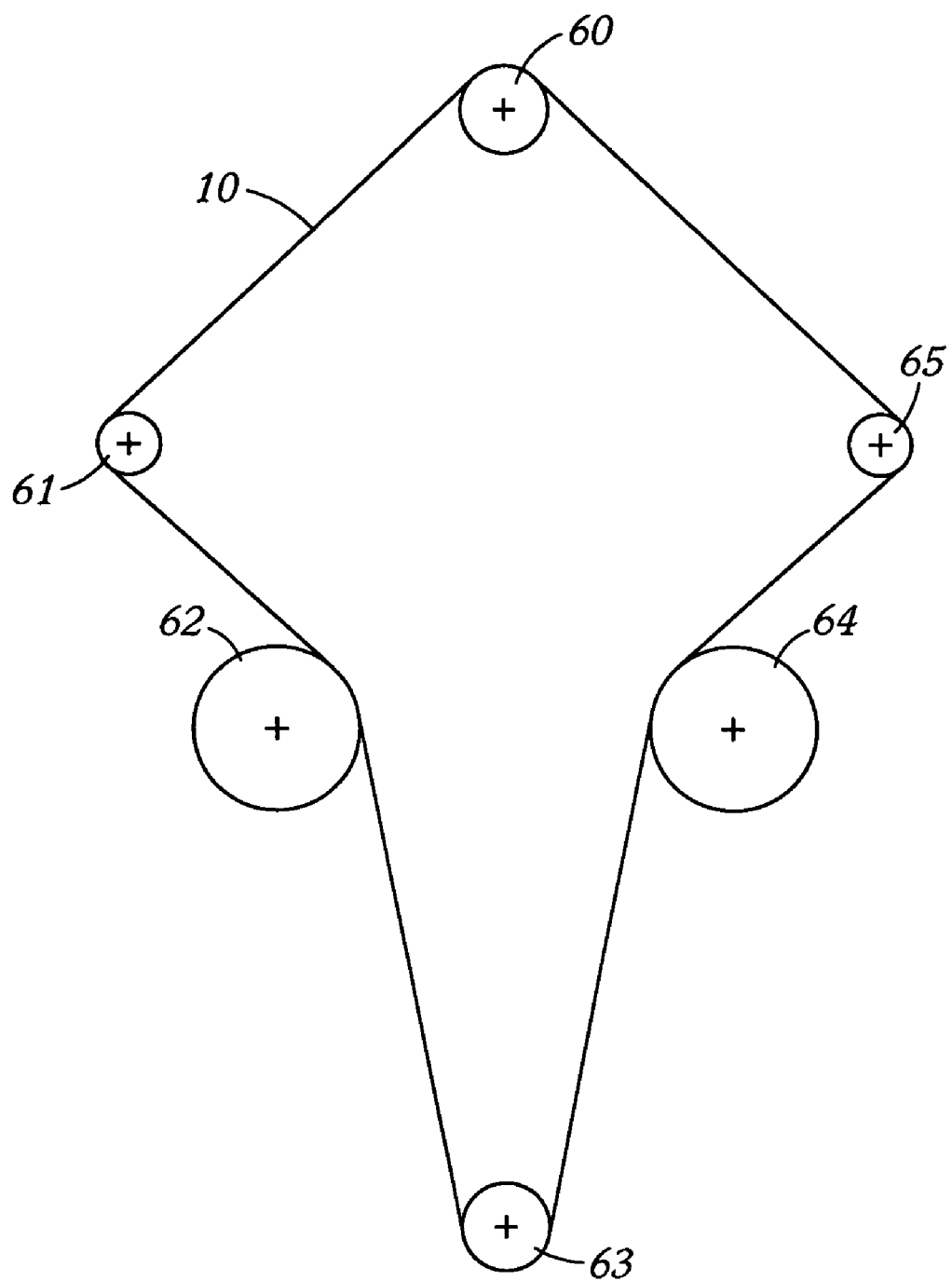

For the Flexural Fatigue Resistance analysis, the belts were trained around two multi-grooved pulleys 60, 63, and four flat idlers 61, 62, 64 and 65 as shown schematically in FIG. 6. The multi-grooved pulleys measured 38 mm in diameter, flat idlers 62 and 64 measured 50.8 mm in diameter, and flat idlers 61 and 65 measured 17.45 mm in diameter. The belts were operated with pulley 60 driven at 8200 rpm, at ambient temperature, with a vertical tension of 45.36 kg applied at 63 to a point of failure as evidenced by tensile cord break or rubber chunk out.

The analyses were performed in each instance in two sets of trials, and the results of each trial are reported separately below. For the first trial, results for which are reported below in Table 1, two identical belts were tested for each of the Flexural Fatigue Resistance and Durability Analyses, and the average of the two results are reported in each case.

TABLE 1

| Example | Fiber of Cord | Tb (kg) | Eb (%) | Force at 1% Elongation (kg) | Force at 2% elongation (kg) | Flex Fatigue Resistance (hrs) | Durability (hrs) |
|---|---|---|---|---|---|---|---|
| Trial 1, Example 1 | PPD-T/PVP | 60.5 | 3.7 | 17.3 | 33.2 | 193 | 260 |
| Trial 1, Comparative Example A | PPD-T | 59.1 | 3.1 | 17.7 | 37.3 | 139 | 190 |

For the second trial, results for which are reported below in Table 2, four identical belts were tested for each of the Flexural Fatigue Resistance and Durability Analyses, and the average of the four results are reported in each case.

TABLE 2

| Example | Fiber of Cord | Tb (kg) | Eb (%) | Force at 1% Elongation (kg) | Force at 2% elongation (kg) | Flex Fatigue Resistance (hrs) | Durability (hrs) |
|---|---|---|---|---|---|---|---|
| Trial 2, Example 1 | PPD-T/PVP | 54.1 | 3.5 | 15.9 | 31.4 | 76 | 251 |
| Trial 2, Comparative Example A | PPD-T | 60 | 3.5 | 17.3 | 34.5 | 60 | 229 |

In a third trial, Durability was again determined for two belts constructed as described above for belts as described above for Example 1 and also for Comparative Example A. In that trial the average of the two results reported for the belts constructed in accordance with the present invention was 191 hours, and that for the comparative belts was 151 hours.

The results reported in the tables and description above indicate that while the modulus of the cords is actually lower (as indicated particularly in the respective Force at 2% Elongation values), the flex fatigue resistance of belts constructed in accordance with an embodiment of the present invention is 27–39% greater than that of belts constructed in accordance with the prior art; and that belt durability for such belts is 10–37% greater than such comparative belts of the prior art.

While the illustration provided above describes specifically multi-V-ribbed belts having EPDM belt body portions, one of ordinary skill in the relevant art would readily appreciate that the present invention is not so limited; and that benefits of the present invention could be derived in any application requiring both a high degree of durability (i.e., retention of load carrying capability) and flexibility, e.g., such belts used in multi-function automotive applications such as generator starter assemblies and accessory drive applications; automotive-and industrial timing belts formed of HNBR or PU, etc. Thus by selecting as a fiber of the load carrier cord of a power transmission belt a fiber comprising or consisting essentially of para-aramid and PVP, and in one embodiment comprising or consisting essentially of PPD-T and PVP as described above, the present invention in one embodiment moreover provides a method of increasing both the flexural fatigue resistance and the durability of a power transmission belt, compared to belts constructed in accordance with prior art techniques.

Although the present invention has been described in detail for the purpose of illustration, it is to be understood that such detail is solely for that purpose and that variations can be made therein by one skilled in the art without departing from the spirit or scope of the present invention except as it may be limited by the claims. The invention disclosed herein may suitably be practiced in the absence of any element that is not specifically disclosed herein.

What is claimed is:

1. An endless belt comprising an elastomeric main belt body portion and a sheave contact portion and having a load carrier cord embedded in said belt body portion, said cord comprising a plurality of fibers comprising para-aramid and polyvinylpyrrolidone; said fibers comprising from about 7% to about 20% by weight of polyvinylpyrrolidone based on the total weight of said para-aramid; and said cord treated with at least a primer and an adhesive.

2. The endless belt of claim 1 selected from a multi-V-ribbed belt, a V-belt and a toothed belt.

3. The endless belt of claim 1 wherein said para-aramid is poly-p-phenylene terephthalamide.

4. The endless belt of claim 3 wherein said fibers comprise 13% by weight of polyvinylpyrrolidone based on the total weight of said poly-p-phenylene terephthalamide.

5. The endless belt of claim 3 wherein said fibers consist essentially of said poly-p-phenylene terephthalamide and said polyvinylpyrrolidone.

6. The endless belt of claim 3 wherein said elastomeric belt body portion comprises a cured elastomer composition.

7. The endless belt of claim 6 wherein said cured elastomer composition comprises at least one of an elastomer selected from:
 a) polyurethane elastomer;
 b) polychloroprene elastomer
 c) acrylonitrile butadiene elastomer;
 d) hydrogenated acrylonitrile butadiene elastomer;
 e) styrene-butadiene elastomer;
 f) alkylated chlorosulfonated polyethylene;
 g) epichlorohydrin;
 h) polybutadiene elastomer,
 j) ethylene alpha olefin elastomer; and
 k) silicone elastomer.

8. The endless belt of claim 6 wherein said elastomer comprises ethylene alpha olefin elastomer and is at least one selected from:
 a) Ethylene propylene copolymer;
 b) Ethylene propylene diene terpolymer;
 c) Ethylene octene copolymer;
 d) Ethylene butene copolymer;
 e) Ethylene octene terpolymer; and
 f) Ethylene butene terpolymer.

9. The endless belt of claim 1 wherein said load carrying cord further comprises an overcoat or rubber cement.

10. A belt drive comprising the belt of claim 1 trained about at least one driver pulley and one driven pulley.

11. The belt of claim 1 wherein said primer is an epoxy-based or isocyanate-based primer.

12. The belt of claim 11 wherein said second adhesive is an RFL.

13. An endless multi-V-ribbed belt comprising an elastomeric undercord and a sheave contact portion positioned along the inner periphery thereof and a tensile section positioned above the undercord and aligned along the length of the belt, said tensile section comprising at least one load carrying cord, and characterized in that said load carrying cord comprises a plurality of fibers consisting essentially of poly-p-phenylene terephthalamide and polyvinylpyrrolidone, said polyvinylpyrrolidone being present in said fibers in an amount within the range of from about 7% to about 20% by weight based on the total weight of poly-p-phenylene terephthalamide, and said cord treated with at least a first primer treatment and a second adhesive treatment.

14. A method for increasing the flexural fatigue resistance and durability of a power transmission belt comprising a belt body portion and a para-aramid load carrier twisted cord embedded in said belt body portion; comprising:
 selecting for the belt's load carrier cord a yarn comprising a fiber of para-aramid and polyvinylpyrrolidone;
 first treating said cord with a primer; and
 second treating said cord with an adhesive.

15. The method of claim 14 wherein said para-aramid is poly-p-phenylene terephthalamide.

16. The method of claim 15 further comprising:
 third treating said cord with an overcoat or rubber cement.

17. The method of claim 15 wherein polyvinylpyrrolidone is present in said fibers in an amount of about 13% by weight based on the total weight of said poly-p-phenylene terephthalamide.

18. The method of claim 15 further comprising:
 combining four of said yarns to form said load carrier cord.

19. The method of claim 18 wherein said combining comprises twisting together said four of said yarns.

20. The method of claim 19 further comprising:
 a first twisting of each of said yarns individually in one direction; and
wherein said twisting together of said yarns is in the opposite direction.

* * * * *